United States Patent [19]

Lebby et al.

[11] Patent Number: 5,228,101
[45] Date of Patent: Jul. 13, 1993

[54] ELECTRICAL TO OPTICAL LINKS USING METALIZATION

[75] Inventors: Michael S. Lebby, Chandler; Davis H. Hartman, Phoenix; Christopher K. Y. Chun, Mesa; Melissa Denvir, Tempe, all of Ariz.

[73] Assignee: Motorola, Inc., Schaumburg, Ill.

[21] Appl. No.: 844,019

[22] Filed: Mar. 2, 1992

[51] Int. Cl.$^5$ ............................................. G02B 6/42
[52] U.S. Cl. ........................................ 385/91; 385/89
[58] Field of Search ............................. 385/89, 90, 91

[56] References Cited

U.S. PATENT DOCUMENTS

| | | | |
|---|---|---|---|
| 4,170,399 | 10/1979 | Hansen et al. | 385/91 |
| 4,610,746 | 9/1986 | Broer et al. | 385/91 |
| 4,729,623 | 3/1988 | Mery | 385/91 |
| 5,101,464 | 3/1992 | Mousseaux et al. | 385/88 |

OTHER PUBLICATIONS

Ladany et al., *IEEE Photonics Technology Letters*, vol. 3, No. 8, Aug. 1991, "Laser to Single-Mode Fiber Assembly Using an Electroforming Technique," pp. 749–751.

*Primary Examiner*—Frank Gonzalez
*Attorney, Agent, or Firm*—Eugene A. Parsons

[57] ABSTRACT

An optical fiber mounted on a substrate and a semiconductor component mounted on a second substrate. The substrates abutting so that the component and fiber are optically aligned and the assembly is held in place by a first layer of adhesive which is then covered with an electroformed layer of metal to form a robust unit.

10 Claims, 1 Drawing Sheet

ELECTRICAL TO OPTICAL LINKS USING METALIZATION

FIELD OF THE INVENTION

The present invention relates, in general, to the formation of electrical to optical links and more specifically to alignment and fixing of semiconductor components to an optical communication medium to form an electrical to optical link.

BACKGROUND OF THE INVENTION

Optical communication systems today utilize semiconductor components that are partitioned independently from an optical communication medium. By way of example, optical fibers are connected in such a manner that makes them compatible with equipment that contains optical semiconductor components. Unfortunately, this partitioning forces an extreme alignment specification on both the connector and the connectorized equipment thus making the procedure expensive.

Traditionally, the alignment of semiconductor light components inside equipment for connection to an optical fiber has been a difficult task. Typically, two critical steps in optical alignment are maximizing coupling efficiency and affixing of an optical semiconductor component in an exact position after alignment is achieved. Optical alignment which maximizes coupling efficiency is completed by a process called active alignment. The active alignment process is a technique that positions optical semiconductor components with an optical fiber as a signal is being passed through. Active alignment is a labor intensive task and is not applicable to mass production of optical couplers and is consequently expensive. Once the optical semiconductor component is aligned to the optical fiber, the optical semiconductor component and the optical fiber must be locked in place with minimal movement. Several current affixing methods or processes include epoxies, laser welding, and low melting-point solder. However, heat developed during these affixing process causes both the optical semiconductor and optical fiber components to expand and contract during cooling, thus causing a misalignment and reduces coupling efficiency.

Therefore, it is desirable to utilize a method to optimize the formation of electrical to optical links and especially between optical semiconductor components and optical fibers which increases performance and reduces manufacturing costs.

SUMMARY OF THE INVENTION

The above and other problems are substantially reduced through the use of a method of forming electrical to optical links including the steps of providing a semiconductor component having an optical input/output and first and second electrical connections mounted on a first supporting substrate, providing an optical fiber with an input/output mounted on a second supporting substrate, positioning the first and second supporting substrates in abutting engagement with the input/output of the optical fiber in alignment with the input/output of the semiconductor component so as to form a junction between the semiconductor component and the optical fiber and between the first and second supporting substrates, applying a curable material to the junction and curing the material to fix the first and second supporting substrates, the optical fiber and the semiconductor component at the junction, and forming a metal layer over the cured material and at least a portion of the first and second substrates to fixedly hold the semiconductor component and the optical fiber in alignment.

The above and other problems are substantially reduced by an electrical to optical link including a semiconductor component having an optical input/output and first and second electrical connections, an optical fiber with an input/output, the input/output of the optical fiber being positioned in alignment with the input/output of the semiconductor component so as to form an optical junction therebetween, a layer of curable material surrounding the junction and cured to fix the optical fiber and the semiconductor component at the junction, and a metal layer overlying the cured material and fixedly holding the semiconductor component and the optical fiber in alignment.

BRIEF DESCRIPTION OF THE DRAWINGS

Referring to the drawings.

DESCRIPTION OF THE PREFERRED EMBODIMENTS

Figure 1:
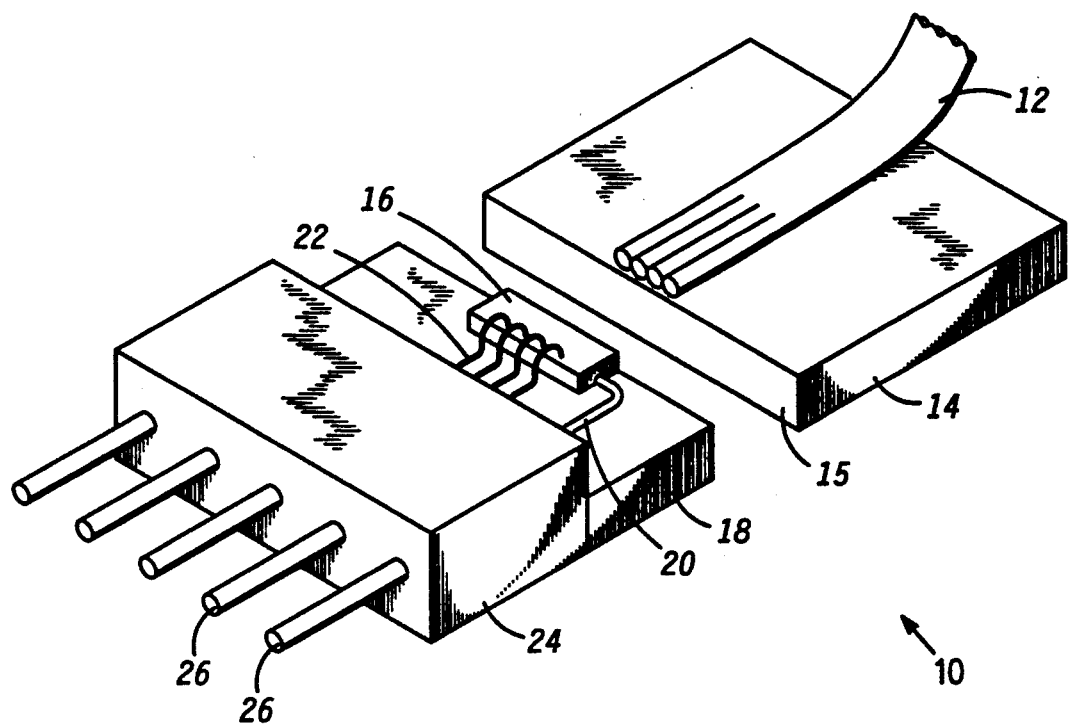
FIG. 1 is a perspective view of an electrical to optical link in accordance with the present invention.

Referring specifically to FIG. 1, an electrical to optical link 10 is illustrated in accordance with the present invention. Link 10 includes a plurality of optical fibers 12 affixed to a substrate 14 so as to extend longitudinally along an upper surface of substrate 14 and generally parallel with each other. Optical fibers 12 include, as is well known in the art, a core, or light transmitting portion, and cladding surrounding the core for protection and to reduce light losses. The core of optical fibers 12 form an input/output therefore and, as illustrated, each of the input/outputs of the plurality of optical fibers 12 lie generally in a common plane. Further, the common plane of the input/outputs for the optical fibers 12 generally includes a vertical surface 15 of substrate 14. It will of course be understood by those skilled in the art that while a plurality of optical fibers 12 are illustrated the methods to be described can be utilized as well for a single optical fiber.

A plurality of semiconductor components 16 are provided which in this specific embodiment are vertical cavity surface emitting lasers (VCSELs). The semiconductor components could be any of a large variety of lasers, photodetectors, or other photonic component. In this specific embodiment the plurality of components 16 are mounted in a single housing with all of the optical input/outputs lying in a common plane which defines one side of the housing (not shown). It will of course be understood that one or a plurality of individual components can be utilized with one or a plurality of optical fibers. Semiconductor components 16 are mounted on an upper surface of a supporting substrate 18 so that the common plane of the input/outputs generally includes a vertical surface of substrate 18.

Each of the plurality of semiconductor components 16 has an optical input/output positioned in optical alignment with the end of the core of a mating optical fiber 12, thus, the lasers emit light directly into the cores of optical fibers 12. Further, the optical input/output of the lasers is approximately the same dimension as the cores of optical fibers 12 and the overall transverse dimension of component 16 is approximately the same as the transverse dimensions (diameters) of optical fibers 12. In the present technology the outer dimensions of VCSELs are approximately 250 microns by 250 microns and it is already foreseeable that this will be reduced to 125 microns by 125 microns or less. The emitting area of, for example, a VCSEL ranges anywhere from approximately 5 microns to 100 microns, depending upon the specific type and application. Further, the outside diameter of, for example, a single mode optical fiber is approximately 125 microns with a core diameter of approximately 6 microns. Multimode fibers have a core diameter as large as 50 microns with a similar increase in the outside diameter thereof.

In this specific embodiment semiconductor components 16 are VCSELs each having one electrical contact on the surface adjacent substrate 18 and in contact with a common lead 20 and a second electrical contact on the upper surface connected by means of lead wires 22. Common lead 20 and lead wires 22 are electrically connected to an enlarged portion 24 of substrate 18. Common lead 20 and the connection to lead wires 22 are interconnects formed in or on the surface of substrate 18. If, for example, substrate 18 is a semiconductor substrate the interconnects may be heavily doped areas. It should be noted that VCSELs are constructed in a variety of different forms, including two electrical contacts on the same side as the emitting area, two electrical contacts on the side opposite the emitting area, one emitting contact on the same side as the emitting area and one on the opposite side, etc. Each form is mounted, depending upon the application, so as to provide the most reliable contact and the easiest manufacturing choice. For example, in some instances a header having conducting leads formed thereon may be affixed to the VCSEL and then the entire assembly affixed to the substrate.

In the present embodiment, substrate 18 is a ceramic hybrid having a metal layer selectively deposited on the upper surface thereof to form the desired interconnects. Portion 24 is a cable housing wherein the relatively delicate lead wires 22 and interconnects are electrically connected to leads 26, which are wires, a connecting cable, or prongs of a multi-lead plug.

Figure 2:
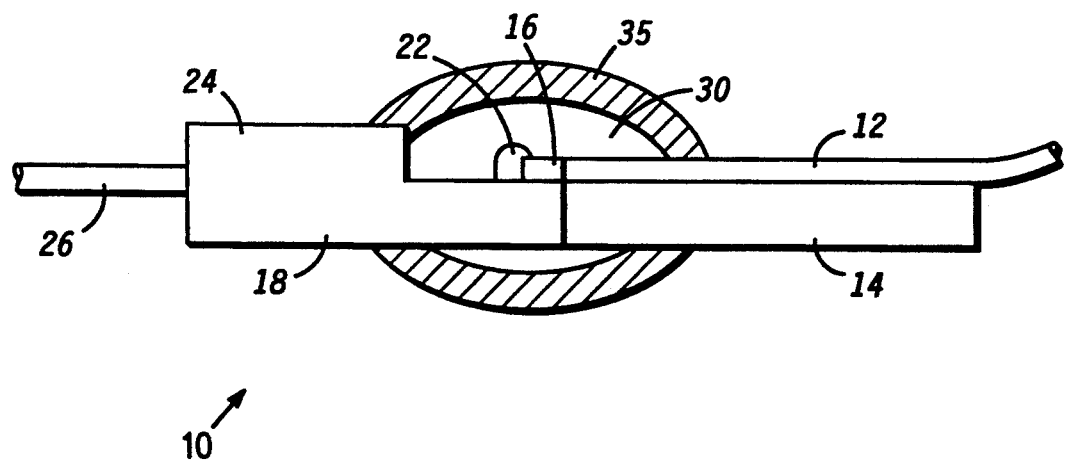
FIG. 2 is a view in side elevation of the electrical to optical link of FIG. 1, portions thereof broken away and shown in section.

Referring to FIG. 2, the method of permanently linking optical fibers 12 to leads 26 is as follows. Substrate 14 is positioned in engagement with substrate 18 so that the vertical faces abut and the input/outputs of optical fibers 12 are optically aligned with the input/outputs of components 16 to form an optical junction therebetween. It should be noted, for example, that fibers 12 can be temporarily held in place on substrate 14 by magnetic holding methods described in copending U.S. application entitled MAGNETIC HOLDING METHODS FOR OPTICAL FIBER I/0 ASSEMBLY, filed of even date herewith, and assigned to the same assignee. The alignment, in the present specific embodiment, is accomplished by active alignment wherein the VCSELs are activated and the amount of light traveling through optical fibers 12 is detected Fibers 12 are then positioned for detection of maximum light, which is an indication that optical fibers 12 are properly positioned relative to semiconductor components 16.

With optical fibers 12 properly positioned, substrates 14 and 18 and fibers 12 and components 16 are attached together by means of a curable material 30. Generally, because a small amount of material 30 may flow between the input/outputs of optical fibers 12 and semiconductor components 16, in some applications it may be desirable to use a material having optical characteristics similar to optical fibers 12 for curable material 30. In some applications the optical junction may be critical and in these instances a small amount of compatible optical gel, etc. may be placed over the junction and cured, after which any convenient curable material 30 is applied for holding the assembly in place. Curable material 30 is any convenient adhesive, curable gel, curable polymer, etc. which is curable, generally at or near ambient temperature and with a minimum generation of heat. Typical curable materials which are utilized for this purpose include silicone gels, cellulose butyrate acetate, poly methyl methacrylate, cyanoacrylate, etc. Optical fibers 12 and semiconductor components 16 are aligned and curable material 30 applied so as to create a minimum of strain in curable material 30 during and after the curing process. This is accomplished generally because the gel curing process adds very little heat to the junction and header 16 operates as a heat sink to remove any heat that might be generated.

Once curable material 30 is properly cured and the assembly is at least temporarily held in place, a coating 35 of metal is deposited over the entire junction and at least partially onto substrates 14 and 18. In this specific embodiment coating 35 is deposited by some convenient metalization process such as electroless plating or electroforming, which includes electrical processes such as electroplating, sputtering, etc. Coating 35 provides the physical strength to hold the assembly fixedly in place and to insure that no misalignment occurs at the optical junction. It is preferable that supporting substrates 14 and 18 are thermally matched so that contraction and expansion due to changes in ambient temperature do not cause misalignment. In some extreme applications it may be desirable to also match coating 30 to supporting substrates 14 and 18 to reduce the possibility of damage during ambient temperature changes.

While the above embodiments are illustrated with VCSELs, it will be understood that any other type of laser, photo-diode, photonic component, etc can be utilized as the semiconductor component. Also, one or more semiconductor components can be formed on a single substrate, rather than individual components, and in some special instances the substrate can be formed as an integral unit with the semiconductor components. Further, the substrate can be formed of any convenient material, e.g. ceramic, semiconductor material, metal, etc., and in any shape that will perform the desired function. Also, when utilizing semiconductor substrates it will of course be understood that heavily doped areas can be substituted for part or all of the connecting conductors.

Thus, electrical to optical links and methods of forming the links have been disclosed. In the disclosed links the dimensions of the entire assembly is only slightly greater than the transverse dimensions of the optical fibers. The semiconductor components, optical fibers and substrates are fixed together with little or no strain occurring between the parts or on the material fixing the parts together. Further, electrical connections are easily and conveniently provided so that the completed link is easily utilized in electrical circuits, such as MCMs, telephone and computer interconnects, etc. The small size of the complete link provides the advantage of additional applications not previously possible and/or practical and applications in denser environments.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. A method of forming electrical to optical links comprising the steps of:
   providing a semiconductor component having an optical input/output and first and second electrical connections mounted on a first supporting ceramic substrate;
   providing an optical fiber with an input/output mounted on a second supporting substrate;
   positioning the first and second supporting substrates in abutting engagement with the input/output of the optical fiber in alignment with the input/output of the semiconductor component so as to form a junction between the semiconductor component and the optical fiber and between the first and second supporting substrates;
   applying curable material to the junction and curing the material to fix the first and second supporting substrates, the optical fiber and the semiconductor component at the junction; and
   forming a metal layer over the cured material and at least a portion of the first and second substrates to fixedly hold the semiconductor component and the optical fiber in alignment.

2. A method of forming electrical to optical links as claimed in claim 1 wherein the step of providing a ceramic substrate includes providing a ceramic hybrid substrate with electrical interconnects formed thereon.

3. A method of forming electrical to optical links as claimed in claim 1 wherein the step of applying a curable material includes the step of applying one of a soluble gel and an adhesive.

4. A method of forming electrical to optical links as claimed in claim 1 wherein the step of applying a curable material includes applying silicone gel.

5. An electrical to optical link comprising:
   a semiconductor component having a plurality of optical input/outputs and first and second electrical connections mounted on a first supporting substrate;
   a plurality of optical fibers positioned on a second supporting substrate generally parallel, with each optical fiber having an input/output and all of the input/outputs lying generally in a common plane;
   the first and second supporting substrates being positioned in abutting engagement with the input/outputs of the optical fibers in alignment with the input/outputs of the semiconductor component so as to form a junction between the semiconductor component and the optical fibers and between the first and second supporting substrates;
   a layer of curable material surrounding the junction and cured to fix the first and second supporting substrates, the optical fibers and the semiconductor component at the junction; and
   a metal layer overlying the cured material and at least a portion of the first and second substrates and fixedly holding the semiconductor component and the optical fibers in alignment.

6. An electrical to optical link as claimed in claim 5 including a plurality of semiconductor components each having an optical input/output, the semiconductor components being positioned on the first supporting substrate with the optical input/outputs lying generally in a common plane.

7. A method of forming electrical to optical links comprising the steps of:
   providing a semiconductor component having an optical input/output and first and second electrical connections mounted on a first supporting substrate;
   providing an optical fiber with an input/output mounted on a second supporting substrate;
   positioning the first and second supporting substrates in abutting engagement with the input/output of the optical fiber in alignment with the input/output of the semiconductor component so as to form a junction between the semiconductor component and the optical fiber and between the first and second supporting substrates;
   applying cellulose butyrate acetate to the junction and curing the cellulose butyrate acetate to fix the first and second supporting substrates, the optical fiber and the semiconductor component at the junction; and
   forming a metal layer over the cured cellulose butyrate acetate and at least a portion of the first and second substrates to fixedly hold the semiconductor component and the optical fiber in alignment.

8. A method of forming electrical to optical links comprising the steps of:
   providing a semiconductor component having an optical input/output and first and second electrical connections mounted on a first supporting substrate;
   providing an optical fiber with an input/output mounted on a second supporting substrate;
   positioning the first and second supporting substrates in abutting engagement with the input/output of the optical fiber in alignment with the input/output of the semiconductor component so as to form a junction between the semiconductor component and the optical fiber and between the first and second supporting substrates;
   applying poly methyl methacrylate to the junction and curing the poly methyl methacrylate to fix the first and second supporting substrates, the optical fiber and the semiconductor component at the junction; and
   forming a metal layer over the cured poly methyl methacrylate and at least a portion of the first and second substrates to fixedly hold the semiconductor component and the optical fiber in alignment.

9. A method of forming electrical to optical links comprising the steps of:
   providing a semiconductor component having an optical input/output and first and second electrical connections mounted on a first supporting substrate;
   providing an optical fiber with an input/output mounted on a second supporting substrate;
   positioning the first and second supporting substrates in abutting engagement with the input/output of the optical fiber in alignment with the input/output of the semiconductor component so as to form a junction between the semiconductor component and the optical fiber and between the first and second supporting substrates;

applying cyanoacrylate to the junction and curing the cyanoacrylate to fix the first and second supporting substrates, the optical fiber and the semiconductor component at the junction; and forming a metal layer over the cured cyanoacrylate and a least a portion of the first and second substrates to fixedly hold the semiconductor component and the optical fiber in alignment.

10. A method of forming electrical to optical links comprising the steps of:

providing a semiconductor component having an optical input/output and first and second electrical connections mounted on a first supporting substrate;

providing an optical fiber with an input/output mounted on a second supporting substrate;

positioning the first and second supporting substrates in abutting engagement with the input/output of the optical fiber in alignment with the input/output of the semiconductor component so as to form a junction between the semiconductor component and the optical fiber and between the first and second supporting substrates;

applying a first curable material compatible with the optical fiber to the junction between the semiconductor component and the optical fiber, curing the first curable material to fix the junction between the semiconductor component and the optical fiber, and applying a second material to fix the first and second supporting substrates; and forming a metal layer over the cured material and at least a portion of the first and second substrates to fixedly hold the semiconductor component and the optical fiber in alignment.

* * * * *